United States Patent
Bai

(10) Patent No.: US 11,190,853 B2
(45) Date of Patent: Nov. 30, 2021

(54) EVENT PROMPTING METHOD AND APPARATUS BASED ON LIVE BROADCASTING

(71) Applicant: JOYME PTE. LTD., Singapore (SG)

(72) Inventor: Xiliang Bai, Cayman Islands (GB)

(73) Assignee: JOYME PTE. LTD., Hong Kong (CN)

( * ) Notice: Subject to any disclaimer, the term of this patent is extended or adjusted under 35 U.S.C. 154(b) by 0 days.

(21) Appl. No.: 16/642,698

(22) PCT Filed: Aug. 1, 2018

(86) PCT No.: PCT/CN2018/097992
§ 371 (c)(1),
(2) Date: Feb. 27, 2020

(87) PCT Pub. No.: WO2019/042064
PCT Pub. Date: Mar. 7, 2019

(65) Prior Publication Data
US 2020/0204871 A1    Jun. 25, 2020

(30) Foreign Application Priority Data
Aug. 30, 2017  (CN) .......................... 201710762637.8

(51) Int. Cl.
*H04N 21/488*  (2011.01)
*G06K 9/00*    (2006.01)
(Continued)

(52) U.S. Cl.
CPC ..... *H04N 21/4882* (2013.01); *G06K 9/00711* (2013.01); *H04N 21/2187* (2013.01);
(Continued)

(58) Field of Classification Search
CPC ........... H04N 21/4882; H04N 21/2187; H04N 21/4788; H04N 21/4784; H04N 21/4223;
(Continued)

(56) References Cited

U.S. PATENT DOCUMENTS

2006/0179451 A1   8/2006  Sung
2014/0016837 A1*  1/2014  Nechyba ............ G06K 9/00221
                                                    382/118
(Continued)

FOREIGN PATENT DOCUMENTS

CN   103458219 A   12/2013
CN   104182741 A   12/2014
(Continued)

*Primary Examiner* — Alazar Tilahun
(74) *Attorney, Agent, or Firm* — LKGlobal | Lorenz & Kopf, LLP

(57) ABSTRACT

Embodiment of a method and apparatus for prompting events in live streaming are provided. The method comprises: acquiring an image from a live streaming video; detecting whether the image contains an image region matching with a preset face image; in response to detecting that the image contains no image region matching with the preset face image, detecting whether a preset event occurs; and in response to detecting that the preset event occurs, presenting first prompt information for prompting occurrence of the preset event. With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

17 Claims, 7 Drawing Sheets

(51) Int. Cl.
*H04N 21/2187* (2011.01)
*H04N 21/4788* (2011.01)

(52) U.S. Cl.
CPC .................. *H04N 21/4788* (2013.01); *G06K 2009/00738* (2013.01)

(58) Field of Classification Search
CPC ........... H04N 21/44008; H04N 21/475; G06K 9/00711; G06K 2009/00738; G06K 9/00228; G06K 9/00268
See application file for complete search history.

(56) References Cited

U.S. PATENT DOCUMENTS

| | | |
|---|---|---|
| 2016/0071326 A1 | 3/2016 | Spivack |
| 2016/0191995 A1* | 6/2016 | el Kaliouby ........... G16H 50/70 725/12 |
| 2019/0182554 A1* | 6/2019 | Schupak ............. H04L 65/4076 |

FOREIGN PATENT DOCUMENTS

| | | |
|---|---|---|
| CN | 106303565 A | 1/2017 |
| CN | 106303662 A | 1/2017 |
| CN | 106658038 A | 5/2017 |
| CN | 107493515 A | 12/2017 |

\* cited by examiner

EVENT PROMPTING METHOD AND APPARATUS BASED ON LIVE BROADCASTING

CROSS-REFERENCE TO RELATED APPLICATION

This application is a U.S. National-Stage entry under 35 U.S.C. § 371 based on International Application No. PCT/CN2018/097992, filed Aug. 1, 2018 which was published under PCT Article 21(2) and which claims priority to Chinese patent application No. 201710762637.8, filed Aug. 30, 2017, which are all hereby incorporated in their entirety by reference.

TECHNICAL FIELD

This application pertains to the field of web application, and in particular, to a method and apparatus for prompting events in live streaming.

BACKGROUND

With the flourishing of Internet technologies, more and more applications are developed to provide convenience for people in daily life and also bring various entertainments to people. Live streaming software is one of such applications. During a live streaming, a live streamer can show content, for example, himself or herself or other materials, to viewers watching the live streaming, and can also interact with the viewers. If the content or the interaction in the live streaming are attractive, the live streamer will have more viewers join the live streaming, and even receive comments or gifts from the viewers. The viewers leaving comments or giving gifts may be regarded as an event in the live streaming. Gifts used in the live streaming are virtual items, such as flowers, yachts, diamond rings, sports cars, etc., which can be redeemed and become actual income of the streamer. This encourages streamers to actively interact with viewers during the live streaming, and to make themselves more popular, so as to attract more viewers and receive more gifts.

In the interaction with the viewers, giving a timely response to viewers' comments or gifts is critical to a live streamer to find favor with the viewers. For example, the streamer should promptly reply to a comment from a viewer upon receiving it, or the streamer should thank a viewer as soon as receiving a gift from the viewer. In this way, the streamer can make the viewers more willing to interact with him or her. However, there are cases that the streamer may not face the screen for example in a long time live streaming or due to other interferences. As a result, the streamer may not realize the viewers' comments or gifts, and thus fails to give a timely response. This may reduce the enthusiasm for the viewers to interact with the streamer. If such cases occur continuously, it will lead to the loss of viewers and less gifts. Therefore, technical solutions are needed to prompt the streamer who does not face the screen when an event occurs during the live streaming. In addition, other objects, desirable features and characteristics will become apparent from the subsequent summary and detailed description, and the appended claims, taken in conjunction with the accompanying drawings and this background.

SUMMARY

The present application provides a method and apparatus for prompting events in live streaming, so as to prompt a streamer who does face the screen when an event occurs during a live streaming. Specific embodiments are described below.

In a first aspect, an embodiment of the present application provides a method for prompting events in live streaming. The method includes:

acquiring an image from a live streaming video;

detecting whether the image contains an image region matching with a preset face image;

in response to detecting that the image contains no image region matching with the preset face image, detecting whether a preset event occurs; and in response to detecting that the preset event occurs, presenting first prompt information for prompting occurrence of the preset event.

Optionally, the preset face image is a full face image of a streamer.

Optionally, the step of detecting whether the image contains the image region matching with the preset face image includes:

detecting whether the image contains a first face region;

if not, determining that the image contains no image region matching with the preset face image;

if so, determining whether the first face region matches with the full face image; and in response to determining that the first face region does not match with the full face image, determining that the image contains no image region matching with the preset face image.

Optionally, the step of determining whether the first face region matches with the full face image includes:

extracting first facial features of the first face region;

comparing the extracted first facial features with respective facial features of the full face image;

calculating the number of the first facial features that match with the facial features of the full face image;

determining whether the number is less than a preset first threshold; and in response to determining that the number is less than the preset first threshold, determining that the first face region does not match with the full face image.

Optionally, the method further includes:

after detecting that the image contains no image region matching with the preset face image and before detecting whether the preset event occurs, presenting second prompt information for prompting the streamer to show the streamer's face in the live streaming video.

Optionally, the preset face image is an eye image of a streamer; and wherein the step of detecting whether the image contains the image region matching with the preset face image includes:

obtaining a first eye region of eyes of the streamer in the image;

determining whether the first eye region matches with the eye image; and in response to determining that the first eye region does not match with the eye image, determining that the image contains no image region matching with the preset face image.

Optionally, the step of determining whether the first eye region matches with the eye image includes:

extracting first eye features of the first eye region;

comparing the extracted first eye features with respective eye features of the eye image;

calculating the number of the first eye features that match with the eye features of the eye image;

determining whether the number is less than a preset second threshold; and in response to determining that the number is less than the preset second threshold, determining that the first eye region does not match with the eye image.

Optionally, the method further includes:

after detecting that the image contains no image region matching with the preset face image and before detecting whether the preset event occurs, presenting third prompt information for prompting the streamer to face a screen.

Optionally, in response to detecting that the image contains an image region matching with the preset face image, the method further includes:

obtaining a second face region of a face of the streamer in the image, which matches with the preset face image;

calculating a ratio of area of the second face region to the image;

determining whether the ratio is greater than a preset third threshold; and in response to determining that the ratio is not greater than the preset third threshold, presenting fourth prompt information for prompting a streamer to adjust a distance between the streamer and a screen.

Optionally, the first prompt information is of one or more of the following types: a voice, a vibration, light, and a text for prompting.

In a second aspect, an embodiment of the present application provides an apparatus for prompting events in live streaming. The apparatus includes:

an acquiring module, configured for acquiring an image from a live streaming video;

a first detecting module, configured for detecting whether the image contains an image region matching with a preset face image;

a second detecting module, configured for, when the first detecting module detects that the image contains no image region matching with the preset face image, detecting whether a preset event occurs; and a first prompt module, configured for, when the second detecting module detects that the preset event occurs, presenting first prompt information for prompting occurrence of the preset event.

Optionally, the preset face image is a full face image of a streamer.

Optionally, the first detecting module includes:

a detecting sub-module, configured for detecting whether the image contains a first face region;

a first determination sub-module, configured for, when the detecting sub-module detects that the image does not contain the first face region, determining that the image contains no image region matching with the preset face image; and a first determining sub-module, configured for, when the detecting sub-module detects that the image contains the first face region, determining whether the first face region matches with the full face image; and if not, triggering the first determination sub-module.

Optionally, the first determining sub-module includes:

a first extracting unit, configured for extracting first facial features of the first face region;

a first comparing unit, configured for comparing the extracted first facial features with respective facial features of the full face image;

a first counting unit, configured for calculating the number of the first facial features that match with the facial features of the full face image;

a first determining unit, configured for determining whether the number is less than a preset first threshold; and a first determination unit, configured for, when the first determining unit determines that the number is less than the preset first threshold, determining that the first face region does not match with the full face image.

Optionally, the apparatus further includes:

a second prompt module, configured for, after detecting that the image contains no image region matching with the preset face image and before detecting whether the preset event occurs, presenting second prompt information for prompting the streamer to show the streamer's face in the live streaming video.

Optionally, the preset face image is an eye image of a streamer; and wherein the first detecting module includes:

an obtaining sub-module, configured for obtaining a first eye region of eyes of the streamer in the image;

a second determining sub-module, configured for determining whether the first eye region matches with the eye image; and a second determination sub-module, configured for, when the second determining sub-module determines that the first eye region does not match with the eye image, determining that the image contains no image region matching with the preset face image.

Optionally, the second determining sub-module includes:

a second extracting unit, configured for extracting first eye features of the first eye region;

a second comparing unit, configured for comparing the extracted first eye features with respective eye features of the eye image;

a second counting unit, configured for calculating the number of the first eye features that match with the eye features of the eye image;

a second determining unit, configured for determining whether the number is less than a preset second threshold; and a second determination unit, configured for, when the second determining unit determines that the number is less than the preset second threshold, determining that the first eye region does not match with the eye image.

Optionally, the apparatus further includes:

a third prompt module, configured for, after detecting that the image contains no image region matching with the preset face image and before detecting whether the preset event occurs, presenting third prompt information for prompting the streamer to face a screen.

Optionally, when detecting that the image contains no image region matching with the preset face image, the apparatus further includes:

an obtaining module, configured for obtaining a second face region of a face of the streamer in the image, which matches with the face image;

a calculating module, configured for calculating a ratio of area of the second face region to the image;

a determining module, configured for determining whether the ratio is greater than a preset third threshold; and a fourth prompt module, configured for, when the determining module determines that the ratio is not greater than the preset third threshold, presenting fourth prompt information for prompting a streamer to adjust a distance between the streamer and a screen.

Optionally, the first prompt information is of one or more of the following types: a voice, a vibration, light, and a text for prompting.

In a third aspect, an embodiment of the present application provides an electronic device including a processor, a communication interface, a memory and a communication bus, wherein the processor, the communication interface, and the memory communicate with each other via the communication bus;

the memory is configured to store a computer program; and the processor is configured to perform any of the method for prompting events in live streaming described above, when executing the program stored on the memory.

In a fourth aspect, an embodiment of the present application provides a computer readable storage medium having stored thereon a computer program which, when executed by a processor, causes the processor to carry out any of the method for prompting events in live streaming described above.

In the above technical solution, an image is acquired from a live streaming video, and a detection as to whether the image contains an image region matching with a preset face image is made. When the image contains no image region matching with the preset face image, a detection as to whether a preset event occurs us made. In response to occurrence of the preset event, first prompt information is presented to prompt the occurrence of the preset event. With the technical solution provided by the embodiments of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objectives, technical solutions and advantages of the present application more apparent, a detailed description of the embodiments will be given with reference to the accompanying drawings. Obviously, the embodiments described are only some instead of all of the embodiments of the present application. Any further embodiments obtained by those of ordinary skills in the art based on the embodiments herein without any creative efforts are within the scope of the present application.

Embodiments of a method and apparatus for prompting events in live streaming are provided herein, to prompt a streamer who does not face the screen when a preset event occurs during the live streaming. The method for prompting events in live streaming includes:

acquiring an image from a live streaming video;

detecting whether the image contains an image region matching with a preset face image;

in response to detecting that the image contains no image region matching with the preset face image, detecting whether a preset event occurs; and in response to detecting that the preset event occurs, presenting first prompt information for prompting occurrence of the preset event.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

Embodiments of a method for prompting events in live streaming will be described below. The method for prompting events in live streaming provided herein is applicable to electronic devices, including but not limited to, such as mobile phones, tablets, computers, etc., and other electronic devices with functionality including displaying and cameras.

Figure 1:
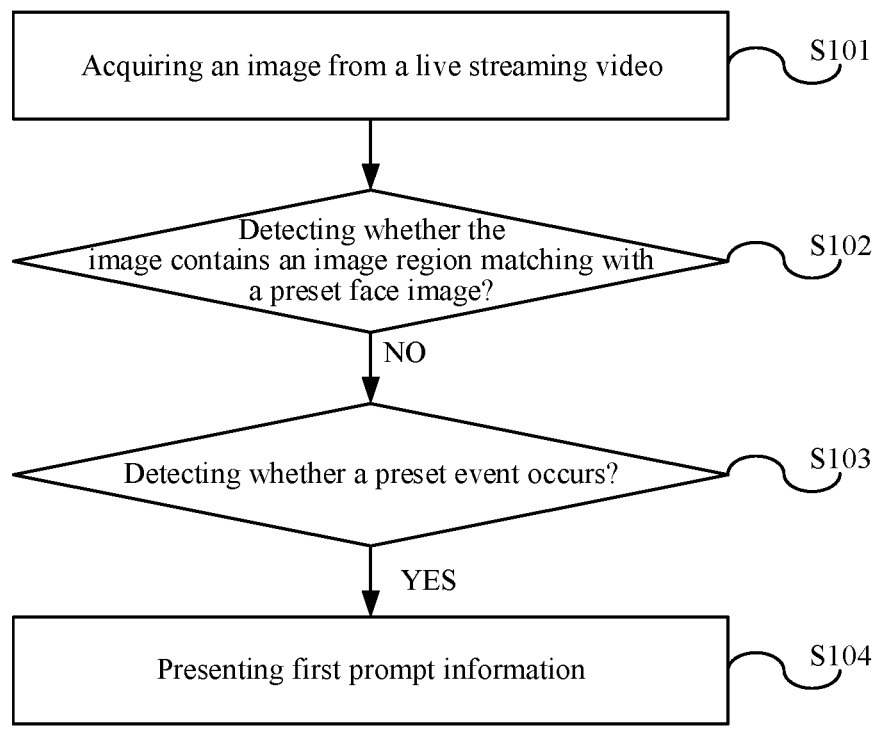
FIG. 1 is a first flow diagram of a method for prompting events in live streaming provided by an embodiment of the present application.

As shown in FIG. 1, a method for prompting events in live streaming provided by an embodiment of the present application includes the following steps.

Step S101, acquiring an image from a live streaming video.

The acquired image is derived from a frame of the live streaming video. The image may be acquired from the live streaming video every preset duration. The preset duration can be customized. For example, the preset duration is set to 2 milliseconds, and thus an image is acquired from the live streaming video every 2 milliseconds.

Step S102, detecting whether the image contains an image region matching with a preset face image, and if not, proceeding to step S103.

The preset face images are pre-stored images of the face of the streamer, which can be grouped into two categories: full face images and partial face images. A full face image may contain the front view of the streamer's face or a non-front view of the streamer's face. The non-front view of the face can be an image of the face presented in the live streaming video when the streamer looks up, looks down or looks to a side, etc. Even when the full face image is a non-front view of the face, the non-front view of the face should include the five sense organs and other facial features, so that it can be used as a reference for full facial features. A partial face image may be an eye image.

In the case where the preset face image is a full face image of the streamer, a detection as to whether the live streaming video contains a face of the streamer is made, so as to ensure that the streamer is facing the screen during the live streaming and can response to a preset event timely, and thus increase the enthusiasm of the viewers to interact with the streamer.

In the case where the preset face image is a partial face image of the streamer, a detection as to whether the streamer faces the screen during the live streaming is made. When it is detected that the streamer does not face the screen, the streamer may be prompted to face the screen, such that the streamer can notice that a preset event occurs and give a timely response to this preset event, so as to better interact with the viewers.

In an implementation, a face recognition approach may be used to detect whether the image contain an image region matching with the preset face image. Upon the start of the live streaming application by the streamer, the face recognition function is enabled. During the live streaming, the face recognition function can monitor the face of the streamer in the live streaming video in real time.

When it is detected that the image contain an image region matching with the preset face image, it means that the streamer's face is presented in the live streaming video. In this case, no action may be performed, or the method may proceed to determine whether the ratio of area of the streamer's face to the area of the image of the live streaming video satisfies a requirement, which is not limited herein.

Step S103, detecting whether a preset event occurs, and if so, proceeding to step S104.

The preset event may be an event associated with the viewers during the live streaming, which may include, but not limited to, at least one of following events: a viewer leaving a comment, a viewer giving a gift, a viewer greeting the streamer, or a viewer joining the live streaming of the streamer.

If no occurrence of the preset event is detected, no action may be performed.

Step S104, presenting first prompt information.

The first prompt information is presented for prompting the occurrence of the preset event. The first prompt information may be of at least one of the following types: a voice, vibration, light, or text.

In the case of a voice prompt, the content of the voice can be preset. For example, the content of the voice may be "you are not facing the screen", "a viewer gives you a gift", and the like. In order to enhance the effect of the voice prompt, in an implementation, while playing the voice, the volume is turned up to its maximum level, so that the voice can be played at full volume. In this way, the prompt can be presented to the streamer in a manner that makes prompt more strong, and the streamer can be well prompted even in a noisy environment.

In the case of a vibration prompt, the prompt can be presented in different vibration modes. The vibration modes can be preset, for example, the vibration mode may be continuous vibration, vibration at intervals, and the like. For the vibration at intervals, the duration of each vibration and the interval between two adjacent vibrations can be preset. For example, the duration of each vibration may be set to 2 seconds, and the interval between two adjacent vibrations may be set to 1 second. That is, the vibration lasts 2 seconds which is followed by a pause of 1 second, and then another two-second vibration starts. Such process is repeated until the vibration prompt is turned off.

In the case of a light prompt, the light used for prompt may be, but not limited to, the light of the screen, or may be an indicator light, and the like. The mode of the light prompt can be preset. In an implementation, the light may flash at a preset frequency and with a preset brightness.

In an implementation, for any one or more of the voice prompt, vibration prompt, and light prompt, the prompt is presented within a preset prompt duration starting from the occurrence of the preset event, and the prompt will stop at the end of the preset prompt duration. The preset prompt duration can be customized. By way of an example, the first prompt information is a voice, and the preset prompt duration is 1 minute. Thus, the voice is repeatedly played within 1 minute starting from the occurrence of the preset event till the end of the 1 minute ends.

In another implementation, the prompt duration is not restricted. When a preset event occurs, a corresponding prompt is continuously presented, and the prompt will not stop until the streamer manually turns it off.

In the case of a text prompt, the content of the text prompt is displayed in a floating window on the screen, and the floating window can be displayed on the screen until the streamer manually closes it. The position of the floating window on the screen can be preset. For example, the floating window can be set to being at the top of the screen. At this point, the text prompt will be displayed at the top of the screen.

The first prompt information may be presented with a single information type or may be presented in a combination of multiple information types, namely, the first prompt information may include a voice, a vibration, light, or a text, or any combination thereof. For example, the first prompt information includes both the voice prompt and the vibration prompt, and when a preset event occurs, the voice prompt and the vibration prompt are simultaneously presented. By combining multiple prompt information types, the prompt can be enhanced.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

On the basis of FIG. 1 and the embodiments associated with FIG. 1 described above, a method for prompting events in live streaming is provided herein in combination with another specific embodiment where the preset face image is a full face image of the streamer.

Figure 2:
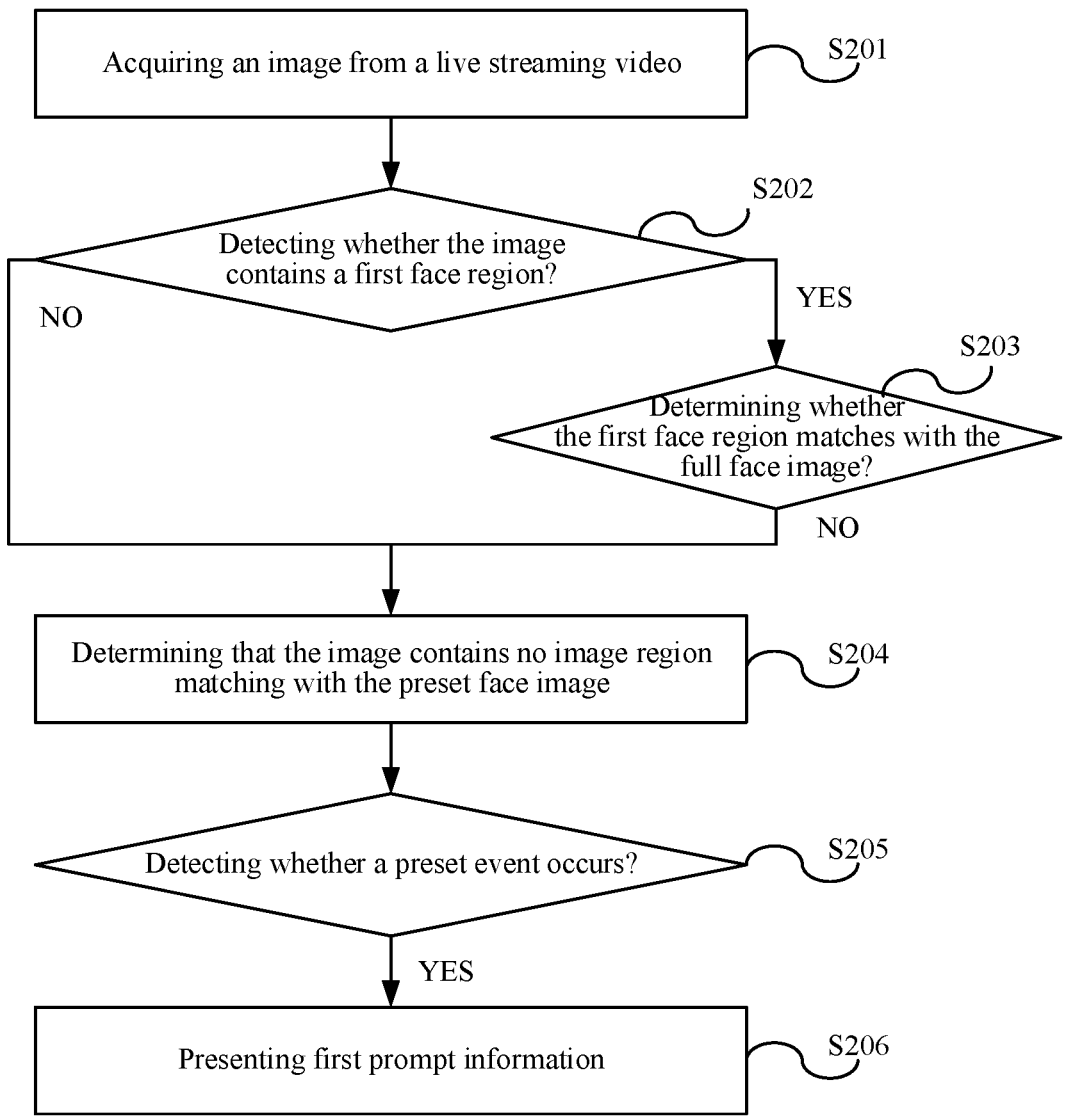
FIG. 2 is a second flow diagram of a method for prompting events in live streaming provided by an embodiment of the present application.

As shown in FIG. 2, the method for prompting events in live streaming provided by an embodiment of the present application includes the following steps.

Step S201, acquiring an image from a live streaming video.

In this embodiment, step S201 is the same as step S101 in the embodiment shown in FIG. 1, and details will not be described herein again.

Step S202, detecting whether the image contains a first face region; if so, proceeding to step S203; and if not, proceeding to step S204.

The first face region may be detected by using a face recognition approach. The detected first face region may be an image region containing the front face or a part of the face. The image region containing a part of the face means an image region including only some of facial features, for example, a side portion of the face.

Step S203, determining whether the first face region matches with the full face image; and if not, proceeding to step S204.

If the first face region matches with the preset full face image, it can be determined that the streamer is presented in the live streaming video. If the first face region does not match with the preset full face image, it can be determined that the image contains no image region matching with the preset face image, and in this case, second prompt information is presented.

In an implementation, the step of determining whether the first face region matches with the full face image (S204) may include the following steps.

In the first step, extracting first facial features of the first face region. The first facial features may include features of at least one type of an eye feature, an eyebrow feature, a nose feature, an ear feature, a mouth feature, a chin feature, and a forehead feature of the first face region. The first facial features may be extracted from the first face region by means of a face recognition approach.

In the second step, comparing the extracted first facial features with respective facial features of the full face image.

The facial features of the full face image may be pre-stored, and the pre-stored facial features may include at least one of an eye feature(s), an eyebrow feature(s), a nose feature(s), an ear feature(s), a mouth feature(s), a chin feature(s), and a forehead feature(s) of the streamer. The facial features of the preset full face image may be extracted by means of a face recognition approach.

The type or types of the first facial features to be extracted may be determined depending on the facial features of the full face image. That is, the type or types of the extracted first facial features should be included in the facial features of the full face image. For example, an eye feature may be extracted as the first facial feature when the facial features of the full face image include at least an eye feature.

Based on such a relationship between the type of the first facial features and that of the facial features of the full face image described above, in an implementation, the type or types of the extracted first facial features correspond to respective type or types of the stored facial features of the full face image. For example, the pre-stored features of the full face image include an eye feature(s), an eyebrow feature(s), a nose feature(s), an ear feature(s), a mouth feature(s), a chin feature,(s) and a forehead feature(s); and then the extracted first facial features include an eye feature(s), an eyebrow feature(s), a nose feature(s), an ear feature(s), a mouth feature(s), a chin feature(s), and a forehead feature(s).

The type or types of features of the face image to be extracted can be preset. For example, the features to be extracted are set to only features of the five sense organs including an eye feature(s), an eyebrow feature(s), a nose feature(s), an ear feature(s), and a mouth feature(s). The pre-stored features of the full face image only include an eye feature(s), an eyebrow feature(s), a nose feature(s), an ear feature(s), and a mouth feature(s); and the extracted first facial features of the first face region also include only an eye feature, an eyebrow feature(s), a nose feature(s), an ear feature(s), and a mouth feature(s).

The first facial features and the features of the full face image are compared by comparing the extracted first facial features with the pre-stored respective features of the full face image one by one. That is, the features of a same type are compared, for example, the eye features in the first facial features are compared to the eye features in the features of the full face image, and the mouth features in the first facial features are compared to the mouth features in the features of the full face image, and so on.

In the third step, calculating the number of the first facial features that match with the facial features of the full face image.

For example, the first face region and the full face image are compared by comparing the features of the five sense organs separately, and the comparison result is that the eyebrow features, eye features, and nose features of the first face region are respectively matched with those of the full face image. Thus, the number of first facial features in the extracted first facial features, which match with the facial features of the full face image, is 3.

After calculating the number of the matched first facial features, a determination as to whether the number is less than a preset first threshold is made. If the number is less than the preset first threshold, it will be determined that the first face region does not match with the full face image.

The preset first threshold can be customized. If the number is greater than or equal to the preset first threshold, it can be considered that the first face region matches with the full face image.

For example, the preset first threshold is 3. When the number of the facial features of the first face region, which match with those of the full face image, is 2, it can be determined that the first face region does not match with the full face image.

Step S204, determining that the image contains no image region matching with the preset face image.

In this embodiment, the preset face image is a full face image of the streamer. The full face image may be a front view of the face, or a non-front view of the face. Both the front view of the face and the non-front view of the face include the five sense organs and other facial features, so that it can be used as a reference for full facial features.

When no first face region is detected in the image, it can be considered that there is no face in the image of the video. At this point, it can be determined that the face of the streamer is not presented in the image. Thus, it can be determined that the image contains no image region matching with the preset face image.

In an implementation, after detecting that the image contains no image matching with the preset face image and before detecting whether a preset event occurs, second prompt information is presented. The second prompt information is presented for prompting the streamer to show his or her face in the live streaming video, so that the streamer can show the best of himself or herself to the viewers and thus become more popular and obtain more support from the viewer.

The second prompt information may be any one or more of information types including such as a voice, a vibration, light, and a text.

The second prompt information may be the same as or different from the first prompt information. When the first prompt information is different from the second prompt information, in an implementation, the first prompt information and the second prompt information may be information of different types. For example, the first prompt information is a voice for prompting, while the second prompt information is a vibration for prompting. In another implementation, the first prompt information and the second prompt information may be information of the same type, but the contents of the first and the second prompt information are different. For example, both the first prompt information and the second prompt information are voices for prompting, and the content of the voice for the first prompt information may be "a viewer gives you a gift", and the content of the voice for the second prompt information is "you are not appeared in the live streaming video".

In addition, because the first prompt information and the second prompt information are presented for different situations, priorities may be set for the first prompt information and the second prompt information. In an implementation, the priority of the first prompt information is higher than that of the second prompt information. After detecting that the face of the streamer is not facing the screen and before detecting whether a preset event occurs, the second prompt information is presented. Upon detecting that the preset event occurs, the first prompt information is presented. At this time, if the second prompt information is still being presented, the first prompt information may replace the second prompt information. In this way, only the first prompt information is presented.

Step S205, detecting whether a preset event occurs, and if so, proceeding to step S206.

Step S206, presenting first prompt information.

In this embodiment, steps S205 and S206 are the same as steps S103 and S104 in the embodiment shown in FIG. 1 described above, and details will not be described herein again.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

On the basis of FIG. 1 and the embodiments associated with FIG. 1 described above, a method for prompting events in live streaming is provided below in combination with another specific embodiment where the preset face image is an eye image of the streamer.

Figure 3:
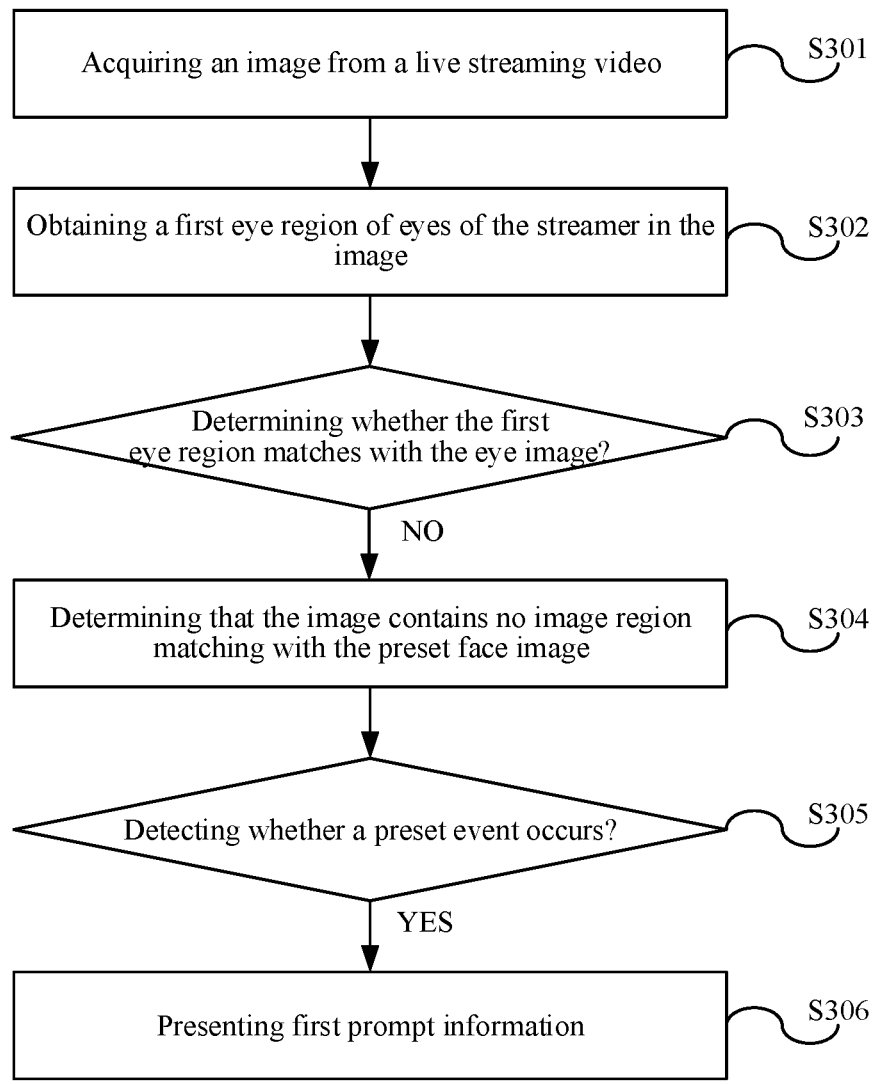
FIG. 3 is a third flow diagram of a method for prompting events in live streaming provided by an embodiment of the present application.

As shown in FIG. 3, a method for prompting events in live streaming provided by an embodiment of the present application includes the following steps.

Step S301, acquiring an image from a live streaming video.

In this embodiment, step S301 is the same as step S101 in the embodiment shown in FIG. 1 described above, and details will not be described herein again.

Step S302, obtaining a first eye region of the streamer in the image.

The first eye region may be obtained by means of a face recognition approach. By using the face recognition approach, features can be extracted from the obtained first eye region. For example, the extracted eye features may be the position of the eyeball or eyeballs.

Step S303, determining whether the first eye region matches with the eye image; and if not, proceeding to step S304.

In an implementation, first eye features are extracted from the first eye region. The first eye features may include features indicating the position of the eyeball(s), and may also include other features of the eye(s), which is not limited thereto.

The extracted first eye features are compared with respective eye features of the eye image.

The eye image can be pre-stored, and the eye features of the eye image can also be pre-stored. The eye features may include multiple types of features, for example, a feature(s) indicating the position of the eyeball(s), etc. The pre-stored feature(s) indicating the position of the eyeball(s) indicate the position of the eyeball(s) when the streamer is facing the screen.

The number of the first eye features that match with the eye features of the eye image is calculated; and a determination as to whether the number is less than a preset second threshold is made. If the number is less than the preset second threshold, it is determined that the first eye region does not match with the eye image.

The preset second threshold can be customized. If the number is greater than or equal to the preset second threshold, it can be considered that the first face region matches with the eye image, and thus it can be determined that the streamer is facing the screen during the live streaming.

For example, when the pre-stored features of the eye image include an eyeball position feature indicating the position of the eyeball(s), the extracted first eye feature of the first eye region will be an eyeball position feature indicating the position of the eyeball(s). The eyeball position feature of the first eye region is compared to the pre-stored eyeball position feature of the eye image. If the eyeball position feature of the first eye region matches with the pre-stored eyeball position feature of the eye image, it can be determined that the image contain an image region matching with the preset face image, that means, the streamer is facing the screen. If the eyeball position feature of the first eye region does not match with the pre-stored eyeball position feature of the eye image, it can be determined that the image contains no image region matching with the preset face image.

In addition, if it is determined that the first eye region matches with the eye image, it can be determined that the streamer appears in the live streaming video and the streamer is facing the screen.

Step S304, determining that the image contains no image matching with the preset face image.

In this embodiment, the preset face image is an eye image of the streamer. When determining that the first eye region does not match with the preset eye image of the streamer, it can be determined that the image contains no image region matching with the preset face image. That means the streamer does not face the screen during the live streaming.

In an implementation, after detecting that the image contains no image region matching with the preset face image and before detecting whether the preset event occurs, third prompt information is presented.

The third prompt information is presented for prompting the streamer to face the screen. The third prompt information may be any one or more of information types including a voice, a vibration, light prompt, and a text.

The third prompt information may be the same as or different from the first prompt information. When the first prompt information is different from the third prompt information, in an implementation, the first prompt information and the third prompt information may be information of different types. In another implementation, the first prompt information and the third prompt information may be information of the same type, but the contents of the first and the second prompt information are different. For example, both the first prompt information and the third prompt information are voices for prompting, and the content of the voice for the first prompt information may be "a viewer gives you a gift", and the content of the voice for the third prompt information is "you are facing the screen".

In addition, because the third prompt information and the first prompt information are presented for different situations, priorities may be set for the third prompt information and the first prompt information. In an implementation, the priority of the first prompt information is higher than that of the third prompt information. After detecting that the face of the streamer is not facing the screen and before detecting whether a preset event occurs, the third prompt information is presented. Upon detecting that the preset event occurs, the first prompt information is presented. At this time, if the third prompt information is still being presented, the first prompt information may replace the third prompt information. In this way, only the first prompt information is presented.

Step S305, detecting whether a preset event occurs, and if so, proceeding to step S306.

Step S306, presenting first prompt information.

In this embodiment, steps S305 and S306 are the same as steps S103 and S104 in the embodiment described above, and details will not be described herein again.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

A method for prompting events in live streaming provided by an embodiment of the present application will be described with reference to another specific embodiment below.

Figure 4:
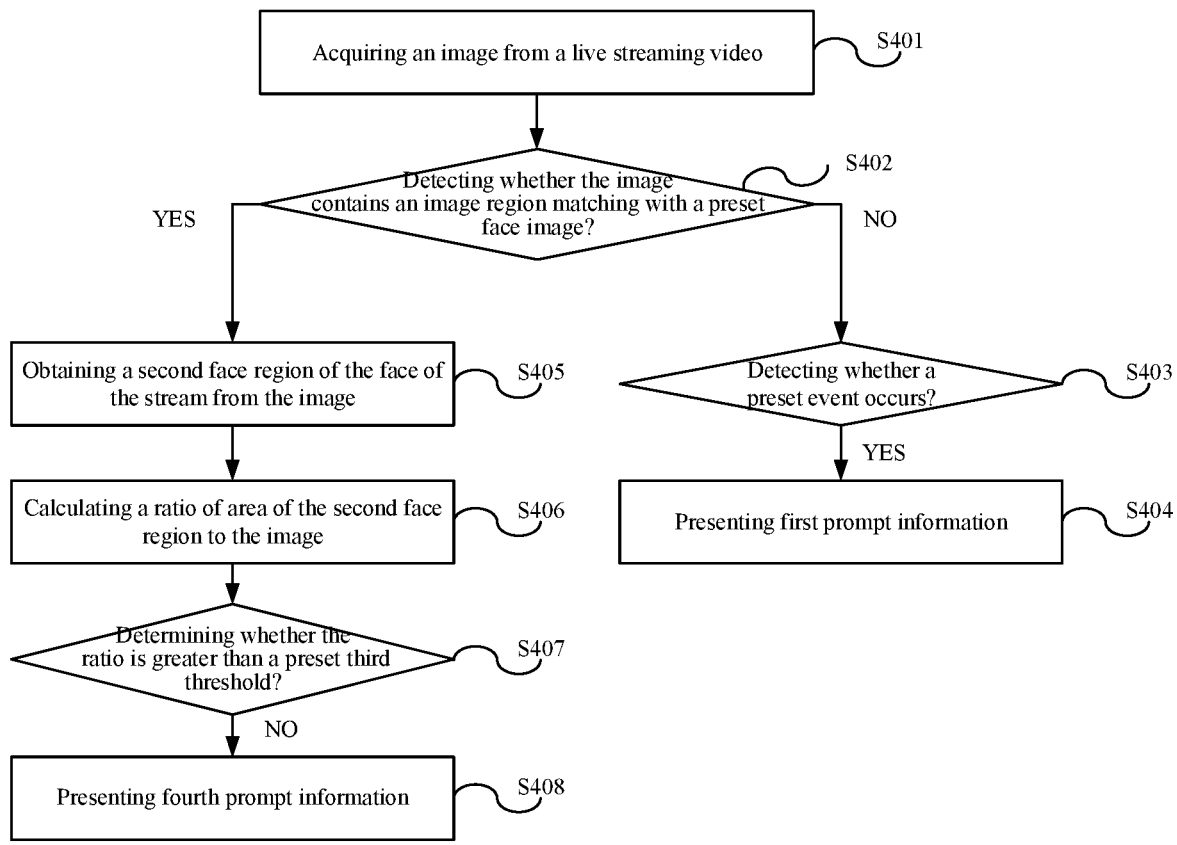
FIG. 4 is a fourth flow diagram of a method for prompting events in live streaming provided by an embodiment of the present application.

Corresponding to the embodiment shown in FIG. 1, a method for prompting events in live streaming provided by an embodiment of the present application, as shown in FIG. 4, includes the following steps.

Step S401, acquiring an image from a live streaming video.

Step S402, detecting whether the image contains an image region matching with a preset face image; if not, proceeding to step S403, and if so, proceeding to step S405.

Step S403, detecting whether a preset event occurs; and if so, proceeding to step S404.

Step S404, presenting first prompt information.

In this embodiment, steps S401 to S404 are the same as steps S101 to S104 in the embodiment described above, and details will not be described herein again.

Step S405, obtaining a second face region of the face of the stream from the image.

The second face region is an image region matching with the preset face image. The second face region can be obtained by means of a face recognition approach. The obtained second face region may be an image region containing the front face of the streamer. Alternatively, the second face region may be an image region containing a part of the face of the streamer, namely, it may be a face image containing only part of facial features, for example, a side portion of the face.

Step S406, calculating a ratio of area of the second face region to the image.

The value of the ratio reflects the image size of the first face region displayed on the screen. The smaller the ratio, the smaller the first face region displayed on the screen. This means there is a long distance between the person associated with the first face region and the screen. Conversely, the larger the ratio, the larger the first face region displayed on the screen. This means there is a short distance between the person associated with the first face region and the screen.

Step S407, determining whether the ratio is greater than a preset third threshold; and if not, proceeding to step S408.

The preset third threshold can be preset.

In order to ensure that the face of the streamer shown on the screen is not too small, a minimum ratio may be preset, which is the preset third threshold. Only when the ratio is greater than the minimum ratio, the face shown on the screen meets the requirement. When the ratio is not greater than the minimum ratio, which means the face shown on the screen does not meet the requirements, prompt information will be presented to prompt the streamer to stay closer to the screen.

Step S408, presenting fourth prompt information.

The fourth prompt information is presented for prompting the streamer to adjust the distance between the streamer and the screen. The fourth prompt information may be any one or more of different types of information including such as a voice, a vibration, light, and a text.

The fourth prompt information may be the same as or different from the first prompt information, the second prompt information, or the third prompt information. When the first prompt information, the second prompt information, the third prompt information and the fourth prompt information are different from each other, in an implementation, the first prompt information, the second prompt information, the third prompt information and the fourth prompt information may be information of different types. For example, the first prompt information is a voice, the second prompt information is a vibration, the third prompt information is a text, and the fourth prompt information is light.

In another implementation, any two of the first prompt information, the second prompt information, the third prompt information and the fourth prompt information may be information of the same type, but contents of the prompt information are different. For example, the first prompt information, the second prompt information, the third prompt information, and the fourth prompt information are all voices, and the content of the voice for the first prompt information may be "a viewer gives you a gift", the content of the voice for the second prompt information may be "you are not shown in the live streaming video", the content of the voice for the third prompt information may be "please face the screen", and the content of the voice for the fourth prompt information may be "please come closer to the screen".

During the live streaming, if the streamer is far away from the camera, the image of the streamer shown in the live streaming video will be small. The image may be too smaller to identify the streamer on the screen. Therefore, in order to avoid such situation, the embodiments of the present application can be used to prompt the streamer to adjust the distance from the screen timely, so that the streamer can better show himself or herself to the viewers, and thus obtain more favor and support from the viewers.

Figure 5:
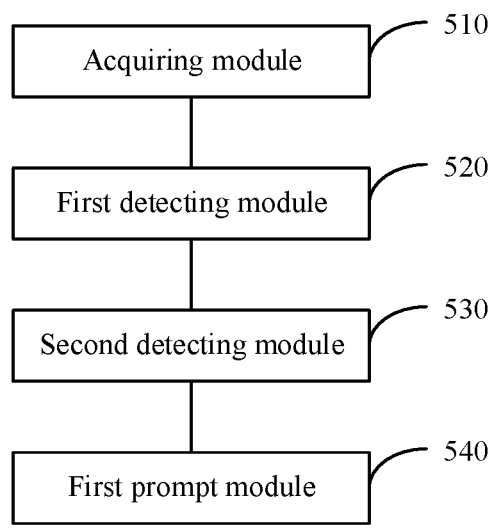
FIG. 5 is a first schematic structure diagram of an apparatus for prompting events in live streaming provided by an embodiment of the present application.

Based on the same concept of the method embodiments described above, an embodiment of the present application further provides an apparatus for prompting events in live streaming, as shown in FIG. 5, the apparatus includes:

an acquiring module 510, configured for acquiring an image from a live streaming video;

a first detecting module 520, configured for detecting whether the image contains an image region matching with a preset face image;

a second detecting module 530, configured for, when the first detecting module detects that the image contains no image region matching with the preset face image, detecting whether a preset event occurs; and a first prompt module 540, configured for, when the second detecting module detects that the preset event occurs, presenting first prompt information for prompting occurrence of the preset event.

In an implementation, the first prompt information is information of one or more of the types: a voice, a vibration, light, and a text.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

On the basis of the embodiment shown in FIG. 5, an embodiment of the present application further provides another specific embodiment, in an implementation, the preset face image is a full face image of the streamer.

Figure 6:
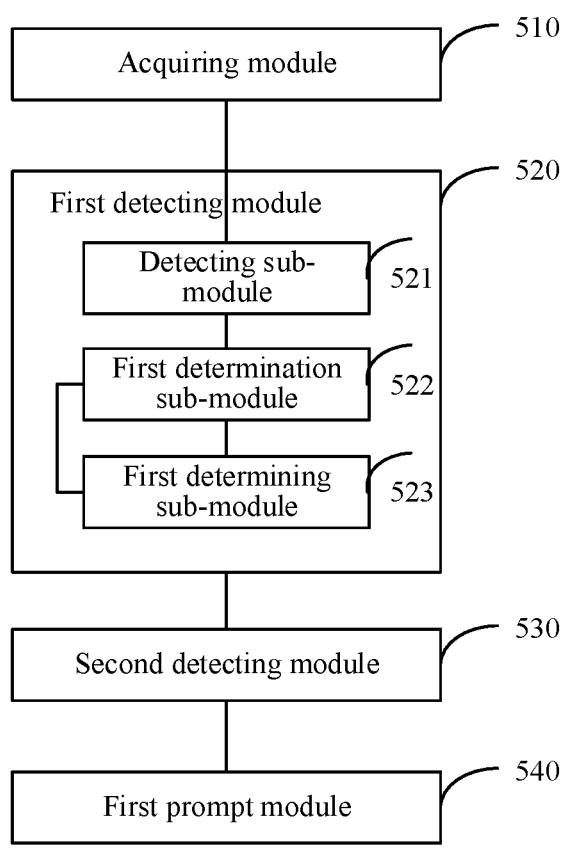
FIG. 6 is a second schematic structure diagram of an apparatus for prompting events in live streaming provided by an embodiment of the present application.

On the basis of FIG. 5 and the embodiment shown in FIG. 5 described above, an embodiment of the present application provides an apparatus for prompting events in live streaming, As shown in FIG. 6, the first detecting module 520 may include:

a detecting sub-module 521, configured for detecting whether the image contains a first face region;

a first determination sub-module 522, configured for, when the detecting sub-module detects that the image does not contain the first face region, determining that the image contains no image region matching with the preset face image; and a first determining sub-module 523, configured for, when the detecting sub-module detects that the image contains the first face region, determining whether the first face region matches with the full face image; and if not, triggering the first determination sub-module 522.

In an implementation, the first determining sub-module 523 includes:

a first extracting unit, configured for extracting first facial features of the first face region;

a first comparing unit, configured for comparing the extracted first facial features with respective facial features of the full face image;

a first counting unit, configured for calculating the number of the first facial features that match with the facial features of the full face image;

a first determining unit, configured for determining whether the number is less than a preset first threshold; and a first determination unit, configured for, when the first determining unit determines that the number is less than the preset first threshold, determining that the first face region does not match with the full face image.

In an implementation, the apparatus further includes: a second prompt module, configured for, after detecting that the image contains no image region matching with the preset face image and before detecting whether the preset event occurs, presenting second prompt information for prompting the streamer to show the streamer's face in the live streaming video.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

Figure 7:
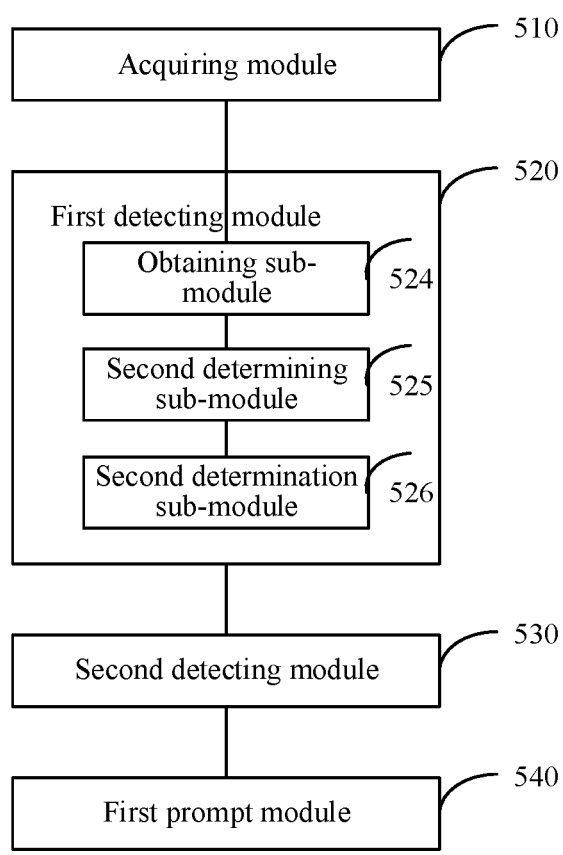
FIG. 7 is a third schematic structure diagram of an apparatus for prompting events in live streaming provided by an embodiment of the present application.

On the basis of FIG. 5, the embodiment of the present application further provides another specific embodiment, as shown in FIG. 7, the embodiment of the present application provides an apparatus for prompting events in live streaming, in which the preset face image is an eye image of the streamer.

The first detecting module 520 may include:

an obtaining sub-module 524, configured for obtaining a first eye region of eyes of the streamer in the image;

a second determining sub-module 525, configured for determining whether the first eye region matches with the eye image; and a second determination sub-module 526, configured for, when the second determining sub-module determines that the first eye region does not match with the eye image, determining that the image contains no image region matching with the preset face image.

In an implementation, the second determining sub-module 525 includes:

a second extracting unit, configured for extracting first eye features of the first eye region;

a second comparing unit, configured for comparing the extracted first eye features with respective eye features of the eye image;

a second counting unit, configured for calculating the number of the first eye features that match with the eye features of the eye image;

a second determining unit, configured for determining whether the number is less than a preset second threshold; and a second determination unit, configured for, when the second determining unit determines that the number is less than the preset second threshold, determining that the first eye region does not match with the eye image.

In an implementation, the apparatus further includes:

a third prompt module, configured for, after detecting that the image contains no image region matching with the preset face image and before detecting whether the preset event occurs, presenting third prompt information for prompting the streamer to face a screen.

With the technical solution provided by the embodiment of the present application, during the live streaming, when the streamer does not face the screen or the streamer is not presented in the live streaming video and a preset event occurs, the streamer can be effectively prompted, so that the streamer aware of the occurrence of the event. This allows the streamer to make a timely response to the event that occurs, which can increase enthusiasm of the viewers, and thus to obtain more support and receive more gifts from the viewers.

Figure 8:
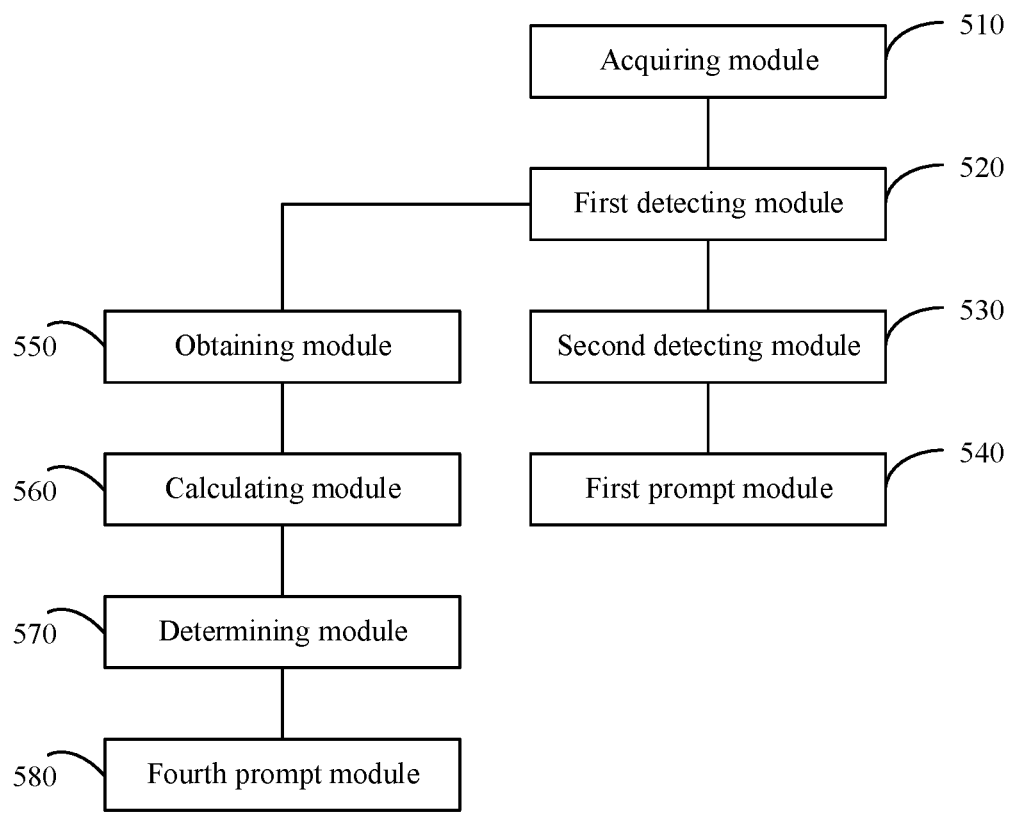
FIG. 8 is a fourth schematic structure diagram of an apparatus for prompting events in live streaming provided by an embodiment of the present application.

On the basis of FIG. 5, an embodiment of the present application further provides another specific embodiment. As shown in FIG. 8, the embodiment of the present application provides an apparatus for prompting events in live streaming, when detecting that the image contains no image region matching with the preset face image, the apparatus may further include:

an obtaining module 550, configured for obtaining a second face region of a face of the streamer in the image, which matches with the face image;

a calculating module 560, configured for calculating a ratio of area of the second face region to the image;

a determining module 570, configured for determining whether the ratio is greater than a preset third threshold; and a fourth prompt module 580, configured for, when the determining module determines that the ratio is not greater than the preset third threshold, presenting fourth prompt information for prompting a streamer to adjust a distance between the streamer and a screen.

During the live streaming, if the streamer is far away from the camera, the image of the streamer shown in the live streaming video will be small. The image may be too smaller to identify the streamer on the screen. Therefore, in order to avoid such situation, the embodiments of the present application can be used to prompt the streamer to adjust the distance from the screen timely, so that the streamer can better show himself or herself to the viewers, and thus obtain more favor and support from the viewers.

A brief description is provided to embodiments of the apparatus in view of their resemblance with the embodiments of the method. Relevant details can be known with reference to the description of the method embodiments.

Figure 9:
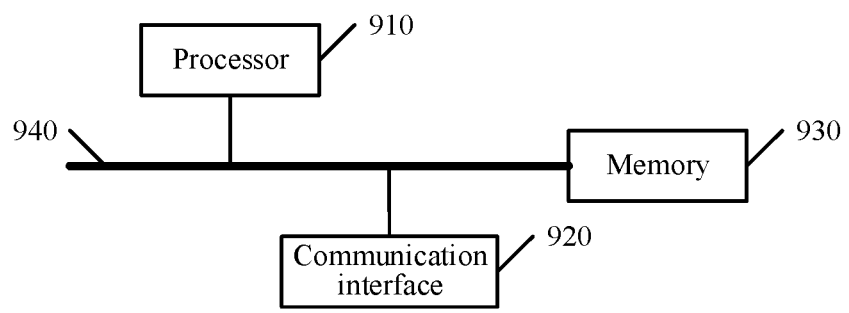
FIG. 9 is a schematic structure diagram of an electronic device provided by an embodiment of the present application.

An embodiment of the present application further provides an electronic device. As shown in FIG. 9, the electronic device includes a processor 910, a communication interface 920, a memory 930 and a communication bus 940. The processor 910, the communication interface 920 and the memory 930 communicate with each other via the communication bus 940.

The memory 930 is configured for storing a computer program.

The processor 910 is configured for performing the following steps when executing the program stored on the memory 930:

acquiring an image from a live streaming video;

detecting whether the image contains an image region matching with a preset face image;

in response to detecting that the image contains no image region matching with the preset face image, detecting whether a preset event occurs; and in response to detecting that the preset event occurs, presenting first prompt information for prompting occurrence of the preset event.

The communication bus in the electronic device may be a peripheral component interconnect (PCI) bus or an extended industry standard architecture (EISA) bus, etc. The communication bus can include an address bus, a data bus, a control bus, and the like. For representation purpose, only one thick line is shown in the figure to indicate the communication bus, while this does not mean there is only one communication bus or one type of communication bus.

The communication interface is provided for communication between the above electronic device and other devices.

The memory may include a random access memory (RAM), or may include a non-volatile memory (NVM), for example at least one disk memory. Optionally, the memory can also be at least one storage device located away from the processor described above.

The processor described above may be a general-purpose processor, such as a central processing unit (CPU), a network processor (NP), etc.; it may also be a digital signal processor (DSP), an application specific integrated circuit (ASIC), field-programmable gate array (FPGA) or other programmable logic devices, discrete gate or transistor logic devices, discrete hardware components.

An embodiment of the present application provides a computer readable storage medium having stored thereon a computer program which, when executed by a processor, causes the processor to perform any of the method for prompting events in live streaming described above.

It should be noted that the relationship terms used herein, such as "first", "second", and the like, are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in a correlated manner, and description of a component in an embodiment may apply to another containing the same. The description for each embodiment focuses on the differences from other embodiments. In particular, a brief description is provided to embodiments of the apparatus for prompting events in live streaming, electronic device and machine readable medium in view of their resemblance with the embodiments of the method. Relevant details can be known with reference to the description of the method embodiments.

The description is only for preferred embodiments of the present application, and are not intended to limit the application. Any modifications, substitutions, improvements, etc., which are made within the spirit and principle of the present application, will fall into the protection scope of the present application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for prompting events in live streaming, comprising:

acquiring an image from a live streaming video;

detecting whether the image contains an image region matching with a preset face image, which indicates whether a streamer does not face a screen or the streamer is not presented in the live streaming video;

in response to detecting that the image contains an image region matching with the preset face image, obtaining a second face region of a face of the streamer in the image, which matches with the preset face image;

calculating a ratio of area of the second face region to the image;

determining whether the ratio is greater than a preset third threshold; and in response to determining that the ratio is not greater than the preset third threshold, presenting fourth prompt information for prompting a streamer to adjust a distance between the streamer and a screen;

in response to detecting that the image contains no image region matching with the preset face image, detecting whether a preset event occurs; and in response to detecting that the preset event occurs, presenting first prompt information for prompting occurrence of the preset event.

2. The method of claim 1, wherein the preset face image is a full face image of a streamer.

3. The method of claim 2, wherein the step of detecting whether the image contains the image region matching with the preset face image comprises:

detecting whether the image contains a first face region;

if not, determining that the image contains no image region matching with the preset face image;

if so, determining whether the first face region matches with the full face image; and in response to determining that the first face region does not match with the full face image, determining that the image contains no image region matching with the preset face image.

4. The method of claim 3, wherein the step of determining whether the first face region matches with the full face image comprises:

extracting first facial features of the first face region;

comparing the extracted first facial features with respective facial features of the full face image;

calculating the number of the first facial features that match with the facial features of the full face image;

determining whether the number is less than a preset first threshold; and in response to determining that the number is less than the preset first threshold, determining that the first face region does not match with the full face image.

5. The method of claim 2, further comprising:

after detecting that the image contains no image region matching with the preset face image and before detecting whether the preset event occurs, presenting second prompt information for prompting the streamer to show the streamer's face in the live streaming video.

6. The method of claim 1, wherein the preset face image is an eye image of a streamer; and wherein the step of detecting whether the image contains the image region matching with the preset face image comprises:

obtaining a first eye region of eyes of the streamer in the image;

determining whether the first eye region matches with the eye image; and in response to determining that the first eye region does not match with the eye image, determining that the image contains no image region matching with the preset face image.

7. The method of claim 6, wherein the step of determining whether the first eye region matches with the eye image comprises:

extracting first eye features of the first eye region;

comparing the extracted first eye features with respective eye features of the eye image;

calculating the number of the first eye features that match with the eye features of the eye image;

determining whether the number is less than a preset second threshold; and in response to determining that the number is less than the preset second threshold, determining that the first eye region does not match with the eye image.

8. The method of claim 6, further comprising:

after detecting that the image contains no image region matching with the preset face image and before detecting whether the preset event occurs, presenting third prompt information for prompting the streamer to face a screen.

9. A non-transitory computer readable storage medium having stored thereon a computer program which, when executed by a processor, causes the processor to carry out the steps of the method of claim 1.

10. An electronic device comprising a processor, a communication interface, a memory and a communication bus, wherein the processor, the communication interface, and the memory communicate with each other via the communication bus; the memory is configured to store a computer program; and the processor is configured to perform the steps of a method for prompting events in live streaming when executing the program stored on the memory, comprising:

acquiring an image from a live streaming video;

detecting whether the image contains an image region matching with a preset face image, which indicates whether a streamer does not face a screen or the streamer is not presented in the live streaming video;

in response to detecting that the image contains an image region matching with the preset face image, obtaining a second face region of a face of the streamer in the image, which matches with the preset face image;

calculating a ratio of area of the second face region to the image;

determining whether the ratio is greater than a preset third threshold; and in response to determining that the ratio is not greater than the preset third threshold, presenting fourth prompt information for prompting a streamer to adjust a distance between the streamer and a screen;

in response to detecting that the image contains no image region matching with the preset face image, detecting whether a preset event occurs; and in response to detecting that the preset event occurs, presenting first prompt information for prompting occurrence of the preset event.

11. The electronic device of claim 10, wherein the preset face image is a full face image of a streamer.

12. The electronic device of claim 11, wherein the step of detecting whether the image contains the image region matching with the preset face image comprises detecting whether the image contains a first face region;

if not, determining that the image contains no image region matching with the preset face image;

if so, determining whether the first face region matches with the full face image; and in response to determining that the first face region does not match with the full face image, determining that the image contains no image region matching with the preset face image.

13. The electronic device of claim 12, wherein the step of determining whether the first face region matches with the full face image comprises:
   extracting first facial features of the first face region;
   comparing the extracted first facial features with respective facial features of the full face image;
   calculating the number of the first facial features that match with the facial features of the full face image;
   determining whether the number is less than a preset first threshold; and
   in response to determining that the number is less than the preset first threshold, determining that the first face region does not match with the full face image.

14. The electronic device of claim 11, further comprising:
   after detecting that the image contains no image region matching with the preset face image and before detecting whether the preset event occurs, presenting second prompt information for prompting the streamer to show the streamer's face in the live streaming video.

15. The electronic device of claim 10, wherein the preset face image is an eye image of a streamer; and
   wherein the step of detecting whether the image contains the image region matching with the preset face image comprises:
   obtaining a first eye region of eyes of the streamer in the image;
   determining whether the first eye region matches with the eye image; and
   in response to determining that the first eye region does not match with the eye image, determining that the image contains no image region matching with the preset face image.

16. The electronic device of claim 15, wherein the step of determining whether the first eye region matches with the eye image comprises:
   extracting first eye features of the first eye region;
   comparing the extracted first eye features with respective eye features of the eye image;
   calculating the number of the first eye features that match with the eye features of the eye image;
   determining whether the number is less than a preset second threshold; and
   in response to determining that the number is less than the preset second threshold, determining that the first eye region does not match with the eye image.

17. The electronic device of claim 15, further comprising:
   after detecting that the image contains no image region matching with the preset face image and before detecting whether the preset event occurs, presenting third prompt information for prompting the streamer to face a screen.

* * * * *